(12) United States Patent
Srikrishna et al.

(10) Patent No.: US 9,047,284 B2
(45) Date of Patent: *Jun. 2, 2015

(54) IDENTIFYING WEB PAGES OF THE WORLD WIDE WEB RELATED TO A FIRST FILE WITH A MORE RECENT PUBLICATION DATE

(71) Applicant: Python4Fun, Inc., San Mateo, CA (US)

(72) Inventors: Devabhaktuni Srikrishna, San Francisco, CA (US); Marc A. Coram, Stanford, CA (US); Christopher Hogan, San Mateo, CA (US)

(73) Assignee: Python4Fun, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,032

(22) Filed: Oct. 2, 2013

(65) Prior Publication Data

US 2014/0025669 A1 Jan. 23, 2014

Related U.S. Application Data

(63) Continuation of application No. 13/438,225, filed on Apr. 3, 2012, now Pat. No. 8,595,221.

(51) Int. Cl.
*G06F 17/30* (2006.01)

(52) U.S. Cl.
CPC ...... *G06F 17/30011* (2013.01); *G06F 17/3053* (2013.01); *G06F 17/30864* (2013.01); *G06F 17/30967* (2013.01); *G06F 17/30867* (2013.01)

(58) Field of Classification Search
USPC .......................... 707/722, 734, 748, 769, 723
See application file for complete search history.

(56) References Cited

U.S. PATENT DOCUMENTS

| | | | |
|---|---|---|---|
| 5,752,020 A | 5/1998 | Ando | |
| 6,327,590 B1 * | 12/2001 | Chidlovskii et al. | .......... 707/734 |
| 6,981,210 B2 * | 12/2005 | Peters et al. | .................. 715/234 |
| 7,707,088 B2 | 4/2010 | Schmelzer | |
| 8,533,232 B1 | 9/2013 | Hartman et al. | |
| 8,595,221 B2 * | 11/2013 | Srikrishna et al. | ............ 707/723 |
| 2004/0117732 A1 | 6/2004 | McNeill et al. | |
| 2005/0097173 A1 | 5/2005 | Johns et al. | |
| 2005/0216429 A1 | 9/2005 | Hertz et al. | |
| 2006/0271561 A1 | 11/2006 | Schlachta-Fairchild et al. | |
| 2007/0288455 A1 | 12/2007 | Hsu | |
| 2008/0109808 A1 | 5/2008 | Wing et al. | |
| 2008/0263103 A1 | 10/2008 | McGregor et al. | |
| 2009/0265737 A1 | 10/2009 | Issa et al. | |
| 2009/0287655 A1 | 11/2009 | Bennett | |
| 2009/0292685 A1 | 11/2009 | Liu et al. | |
| 2010/0145958 A1 | 6/2010 | Duffy et al. | |
| 2011/0035674 A1 | 2/2011 | Chenoweth et al. | |

(Continued)

*Primary Examiner* — Etienne Leroux
(74) *Attorney, Agent, or Firm* — Brian R. Short

(57) ABSTRACT

Methods and systems for providing related web pages are disclosed. One method includes identifying a plurality of web pages, wherein the plurality of web pages each have a relationship with the first file, wherein the world wide web provides a platform for sharing web pages, and wherein each web page includes a document or information resource that is suitable for the world wide web and is accessible through a web browser. The method further includes generating a list of inquiries based on the plurality of web pages, providing, the list of inquiries to at least one author of the first file, receiving from the at least one author at least one response to the list of inquiries, selecting a subset of the plurality of web pages based on the at least one response, and storing information related to the selected subset of the plurality of web pages.

20 Claims, 10 Drawing Sheets

(56) References Cited

U.S. PATENT DOCUMENTS

| | | |
|---|---|---|
| 2011/0087658 A1 | 4/2011 | Lunt |
| 2011/0096014 A1 | 4/2011 | Fuyuno et al. |
| 2011/0119243 A1 | 5/2011 | Diamond et al. |
| 2011/0161345 A1 | 6/2011 | Dworkin et al. |
| 2011/0231104 A1 | 9/2011 | Lambert |
| 2011/0307491 A1 | 12/2011 | Fisk |
| 2011/0314049 A1 | 12/2011 | Poirier et al. |
| 2012/0066201 A1 | 3/2012 | Suman et al. |
| 2012/0078945 A1* | 3/2012 | Hurst .......................... 707/769 |
| 2012/0084629 A1 | 4/2012 | Patrawala et al. |
| 2012/0113273 A1 | 5/2012 | Rothschild |
| 2012/0158747 A1* | 6/2012 | Satow et al. .................. 707/748 |
| 2012/0221687 A1 | 8/2012 | Hunter et al. |
| 2012/0233152 A1* | 9/2012 | Vanderwende et al. ...... 707/722 |

\* cited by examiner

200

Are any of the following updates to World Wide Web relevant to your paper? (i.e. Chronic Obstructive Pulmonary Disease : Effects beyond the Lungs) 208

● Yes, some of them are relevant   204   ◎ No, none of them are relevant   206

Check all that apply – if checked use the text box below them to explain why it is related Microalbuminuria and hypoxemia in patients with chronic obstructive pulmonary disease.(2010 Oct 15 PubMed) Found using (Celli) AND ("stable patients") - Albert Einstein, Professor of Physics, Princeton University, albert.einstein@princeton.edu, 113 Market St. Princeton, NJ   218

[x] Relevant systemic effect

Addressing the complexity of chronic obstructive pulmonary disease: from phenotypes and biomarkers to scale-free networks, systems biology, and P4 medicine. (2011 May 1 PubMed) Found using ("celli") AND ("Review obstructive pulmonary")- Oppenheimer, Professor of Physics, —212 oppenheimer@ucberkeley.edu, University of California, 145 Main Street, Berkeley   220

216 — Directly Relevant

[ ] Involvement of endothelial apoptosis underlying chronic obstructive pulmonary disease-like phenotype in adiponectin-null mice: implications of therapy. (2011 May 1 PubMed)Found ("link between COPD") AND ("systematic inflammation")-William Shockley, Professor of Physics, william.shockley@mit.edu, Massachusetts Institute of Technology, 444 El Camino Real, Cambridge, MA

210

[x] Comparison of biomarkers of subclinical lung injury in obstructive sleep apnea. (2010 Jul 11 PubMed)Found using ("lung-specific biomarker")-Albert Einstein, Professor of Physics, Princeton University, albert.einstein@princeton.edu, 113 Market St. Princeton, NJ

214

[ ] The link between periodontal disease and cardiovascular disease: How far we have come in the last two decades? (2010 Jul 11 PubMed)Found using ("link between COPD") AND ("Review 222 obstructive pulmonary")-William Shockley, Professor of Physics, william.shockley@mit.edu, Massachusetts Institute of Technology, 444 El Camino Real, Cambridge, MA

FIGURE 2

Are any of the following updates to PubMed relevant to your paper? (i.e. Chronic Obstructive Pulmonary Disease : Effects beyond the Lungs) 202

⦿ Yes, some of them are relevant   ◎ No, none of them are relevant 204   212   214   206

Check all that apply – if checked use the text box below them to explain why it is related

[X] Chronic obstructive pulmonary disease and lung cancer at the end of life (2010 May 22 PubMed)-Albert Einstein, Professor of Physics, Princeton University, albert.einstein@princeton.edu, 113 Market St. Princeton, NJ

218

Related topic 216   222

[ ] Experimental pulmonary infection and colonization of Hemophilic influenzae in emphysematous hamsters (2010 Aug PubMed) Oppenheimer, Professor of Physics, oppenheimer@ucberkeley.edu, University of California, 145 Main Street, Berkeley   210

220

312

[ ] Pulmonary hypertension related to pulmonary diseases or hypoxia and its treatment (2010 Sep PubMed)   Shockley, Professor of Physics, william.shockley@mit.edu, Massachusetts Institute of Technology, 444 El Camino Real, Cambridge , MA

[ ] Systemic diseases and the elderly. (2010 Sep PubMed)   Shockley, Professor of Physics, william.shockley@mit.edu, Massachusetts Institute of Technology, 444 El Camino Real, Cambridge , MA

[X] Chronic obstructive pulmonary disease and its comorbidities (July 2011, PubMed)Albert Einstein, Professor of Physics,Princeton University, albert.einstein@princeton.edu, 113 Market St. Princeton, NJ

FIGURE 3

IDENTIFYING WEB PAGES OF THE WORLD WIDE WEB RELATED TO A FIRST FILE WITH A MORE RECENT PUBLICATION DATE

RELATED APPLICATIONS

This patent application is a continuation of U.S. patent application Ser. No. 13/438,225 filed on Apr. 3, 2012, which is herein incorporated by reference.

FIELD OF EMBODIMENTS

The described embodiments relate generally to search results. More particularly, the described embodiments relate to methods, and systems for identifying web pages of a world wide web having relevance to a first file.

BACKGROUND

Search engines use a variety of search techniques to present web pages to users based on one or more search terms that are provided by the users. The relevance of the search results relate closely to the search terms. Selection of a web page from the search results in the search engine provides a list of web pages related to the selected web page. Users who like to read more about the related subject matter use the results suggested by the author or the search engine itself. Many authors suggest related web pages that are very valuable to users also referred to as citations. The suggested list however is older than the selected web page. For web pages published after the publication date of the selected web page, users have to rely on the search engine to provide a relevant list. The web pages suggested by search engines are based on the search engine's algorithm. The search engine generally produces a large number of web pages that include some irrelevant results and are difficult to sort for relevant web pages. Many suggested web pages are not relevant to the user. Relevant results are not always provided.

It is desirable to have methods and systems for providing an up-to-date list of web pages related to the selected web page relevant to the subject matter of the selected web page.

SUMMARY

One embodiment includes a method of identifying one or more web pages in the World Wide Web related to a first file. The method includes identifying a plurality of web pages within the world wide web, wherein the plurality of web pages each have a relationship with the first file, wherein each of the plurality of web pages includes a publication date, wherein each of the publication dates is more recent than at least one of a first revision or a last revision date of the first file, wherein the world wide web provides a platform for sharing web pages, and wherein each web page includes a document or information resource that is suitable for the world wide web and is accessible through a web browser. The method further includes generating, by a system server, a list of inquiries based on the plurality of web pages, providing, by the system server, the list of inquiries to at least one author of the first file, receiving from the at least one author at least one response to the list of inquiries, selecting a subset of the plurality of web pages based on the at least one response, and storing information related to the selected subset of the plurality of web pages for access if the first file is selected.

Another embodiment includes providing the list of enquiries to more than one author. In another embodiment, a different list of inquiries is provided to a first author and other authors. The identified web pages are ranked based on the responses from all the authors and a subset of web pages is selected.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

In the following figures like reference numbers are used to refer to like elements. Although the following figures depict various examples, the one or more implementations are not limited to the examples depicted in the figures.

FIG. 2 shows an example list of inquiries presented to the authors.

FIG. 3 is another example list of inquiries presented to the authors.

DETAILED DESCRIPTION

The described embodiments are embodied in methods, and systems for providing a set of web pages to a user in the World Wide Web, where the set of web pages have relevance to the first file from a search or retrieval of a record identifying the first file.

Figure 1:
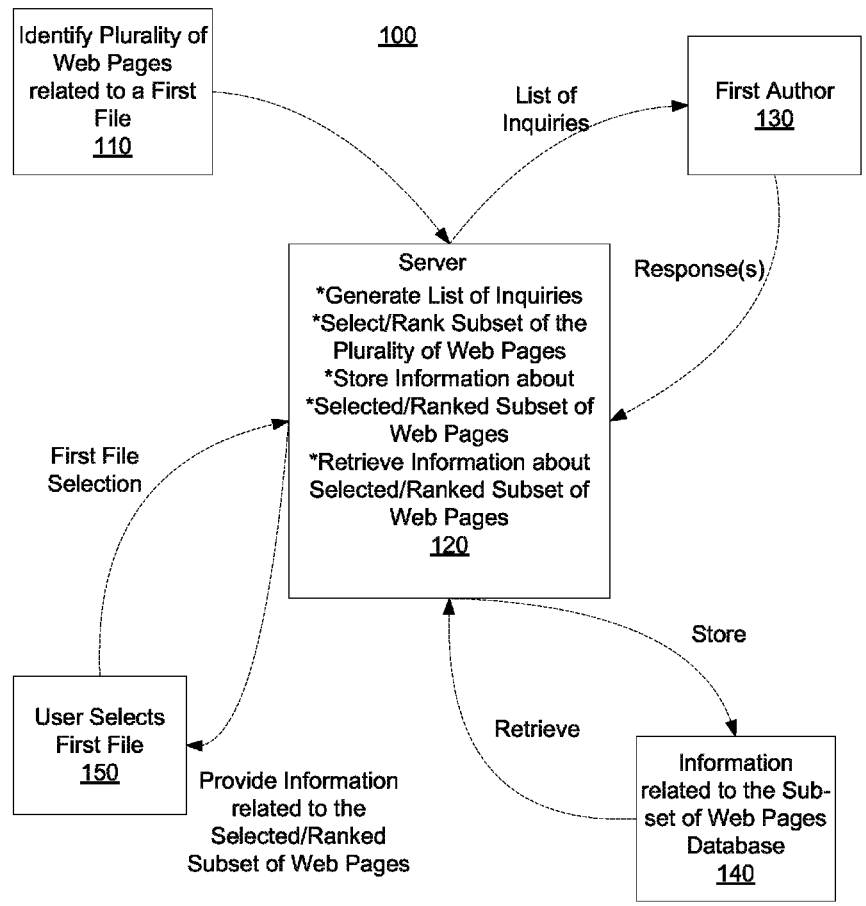
FIG. 1 is a block diagram of an embodiment of a system of providing related web pages from the World Wide Web, where an author provides input to selecting/ranking a subset of web pages.

FIG. 1 is a block diagram of an embodiment of system 100, a system of providing related web pages from the World Wide Web to a first file, where an author is involved in selecting/ranking a subset of web pages.

For at least some embodiments, the World Wide Web provides a platform for sharing web pages, wherein each web page includes a document or information resource that is suitable for the world wide web and is accessible through a web browser. The World Wide Web contains several collections of documents of electronic text containing knowledge created by humans such as research papers, blog posts, web pages, videos, or video transcripts. Users can upload web pages and share the web pages immediately without the need to email or transport using portable storage drives. The World Wide Web stores web pages or documents of different file formats not limited to word documents, power point presentations, portable web page format (pdf), and spreadsheets. In one embodiment of the World Wide Web, a user may contribute to the World Wide Web. In an embodiment, any user may edit a file similar to a wiki.

In several embodiments, a first file is a file in the World Wide Web, a file whose URL is shared by the user on a social network such as Twitter or Facebook, a file on the disk drive of the user system, or a file on the internet, or a file on any other file system identified to generate a list of related web pages. The first file may be a recently added file to the World Wide Web, or identified due a large number of web pages added to the World Wide Web in the same subject matter, or identified automatically for a periodic update of related web pages, or identified by any other method. It is to be understood that for various embodiments, the first file includes at least one of a web page, a document, an article, a social profile, a message, a message thread, a conversation, a video file, an audio file, or a picture file. It is also to be understood that this is not an exhaustive list.

The World Wide Web is updated constantly as users add web pages. As the number of web pages grows, existence of the file may not be known to many users if relevant hyperlinks from other web pages are not created. Creating hyperlinks is a manual task and often few web pages are linked together in the World Wide Web. Search engines provide access to the web pages that are not linked.

Many authors list references or citations in their web pages. The web pages referenced by authors are generally more relevant than the machine generated references, but have a publication date earlier than the current file. Unlike machine generated references using an algorithm running on a computer, the judgment of authors in selecting reference web pages is valuable to other readers due to the author's intrinsic understanding and motivation to identify materials related to a file a or web page. In general, an author or expert has greater interest and more precise understanding of the subject matter discussed in the author's file or web page compared to other readers. In the described embodiments, an author is a sole author, co-author, an expert on the subject matter or a team member or anyone who has write-privilege to the first file.

Search engines list related web pages that are published before or after a file has been published. When a file is selected from the search results, a set of related web pages is generally presented by the search engine. The set of related web pages are based on some criteria such as the number of hyperlinks a file has, common subject matter, and the frequency of certain phrases. The number of hyperlinks is one of the criteria for search engines to list a file at the top of the related web pages. If a file has no hyperlinks pointing to the file itself, the search engine may not list a file at the top though the file may be relevant. The criteria for suggesting a list of related web pages can be improved by using an expert or author to recommend the web pages through hyperlinks. The process of semi-automating the presentation of a list of related web pages is described in the embodiments.

A set of web pages related to the first file is identified in World Wide Web 110 by server 120. In one embodiment, identifying in World Wide Web 110 includes server 120 identifying a set of web pages related to the first file and receiving the list of identified web pages. In another embodiment, identifying in World Wide Web 110 includes server 120 receiving the list of identified web pages. The set of identified web pages 110 can be the output of natural language search, or a text analysis, or from collaborative filtering, or any other search technique. In several embodiments, the search can be based on a string of words, or a picture or an author. The set of web pages is derived based on a relationship with the first file. In several embodiments, the relationship can be any one of or some of author of the first file, author of the references cited in the first file, frequently used noun phrases, publication date later than the first file, a specific publication date, or a publication date after a specific date. Web pages published from an author tend to have common subject matter. Frequently used noun-phrases in the first file are also keywords for searching related web pages. However, the occurrence of any specific noun phrase in the web may change with technology or over a period of time. Many search engines may not have the intelligence to recognize the changing noun phrases over a period. In some embodiments, the full-text of the file is used for searching to yield more relevant related web pages. Web pages with publication date later than the first file are valuable as users are generally interested in recent updates.

In an example, a search engine operating on server 120 uses ENTREZ® API to identify bibliography of post-publication updates to papers in PubMed®, based on noun phrases in full-text. PubMed® is a free database of references and abstracts on life sciences and biomedical topics. ENTREZ® is a powerful search engine that allows users to search health sciences database at the National Center for Biotechnology Information website. The algorithm used to generate the search terms using ENTREZ® API automatically extracts noun phrases from a file using natural language processing tools and ranks them by the number of occurrences in the file compared to the number of occurrences on the web. In another embodiment a search Application Programming Interface (API), such Yahoo Build Your Own Search Service® (BOSS) may be used.

In an embodiment, citation-validation is used to generate the list of related web pages 110. Citation-validation is defined as search results from queries where the queries are present in one or more citations provided by the author. Citation-validated search terms improve the relevance of the search results compared to search terms that are not present in the citations. The citations can written by the same authors as the file or written by different authors.

Server 120 generates a list of inquiries based on the set of web pages related to the first file. In an embodiment, the list of inquiries includes questions asking the author whether the web pages are relevant to the first file, and the search terms used in keyword search or noun-phrase used to select the file.

FIG. 2 shows example 200, an inquiry generated using keyword search in the World Wide Web. Selection of keyword search results displays related web pages. Example 200 shows the related web pages from keyword searches. In example 200, 202 is the title of the first file. The first question summarizes the inquiry about relevant web pages. 204 is a check box next to a related file selected by a search engine. 206 is the publication date of the related file. 208 is the search term used to identify the related file. 210 is an input box for the author to enter the reason for the file being relevant. 212 shows the author who selected the profile as relevant. 214 shows the institution of the author. 216 shows the relationship tag, 218 shows the email address of the author, 220 shows the address and 222 shows the affiliation of the author. In one embodiment, the identity of the senders who selected each message thread is revealed to the user by displaying metadata such as the sender's name, address, or contact information.

FIG. 3 shows example 300 showing related citations on the World Wide Web and display the web pages published after the first file. In an embodiment, related citations on World Wide Web are derived from text-analysis of files, and a single ranked list of web pages that may be related. For each word or term in each file, a numeric weight is computed based on the number of times the word occurs in the file and the number of files that the term occurs in the World Wide Web. The numeric-weight is used to find the most similar pairs of files. 312 is the title of the web page obtained from related citations. In another embodiment, Google Scholar indexes the web pages and includes "automatic hyperlinks" or "related web pages" functions in place of "related citations."

For an embodiment, again referring to FIG. 1, an author 130 is notified of the list of inquiries generated by server 120. In the described embodiments, the notification can be sent electronically. In an embodiment, the notification email contains a link to a webpage that contains the list of inquiries. In another embodiment, the email contains the text of the inquiries. In another embodiment, the notification is sent by an email or message on a social network such as Facebook® or instant message system. In another embodiment, the notification is sent from a web-based interface such as Jive®, or LinkedIn® or Google Docs®. In an embodiment, the author completes the inquiry by selecting one or more web pages related to the first file in the opinion of the author, and sends the response to the server using any of the notification methods described above. In an embodiment, the author includes the relationship of one or more web pages such as whether the web page complements the first file, or summarizes the first file or contradicts the first file. Server 120 receives the response to the inquiry from the author and processes the response. The response includes a selection of web pages related to the first file. In an embodiment, the response includes a ranked list of the related web pages, identifying the relevance of the related web pages to the first file.

In an embodiment, web pages selected by the author are ranked higher than the web pages not selected by the author. A subset of the ranked web pages is selected. In another embodiment, all web pages selected by first file author 130 are selected. In another embodiment, a certain number of ranked web pages are selected. Server 120 creates a hyperlink between the first file and the subset of selected/ranked web pages in the World Wide Web. The hyperlink influences future search results of the engine when the first file or any of the subset of web pages is involved. Server 120 stores information about the subset of related web pages in a storage system 140. In an embodiment, the information includes one or more of hyperlinks to the related web pages, ranking of the web pages, the author of the first file, and metadata of the web pages. In the described embodiments, hyperlinks are references to web pages that connect the users to another file or a portion of the file. In an embodiment, file storage system 120 resides on server 120. In another embodiment, storage system 140 is a separate file storage system. When a user (150) selects the file identifier from the search results or any other listing, server 120 retrieves information about the selected/ranked related web pages. In an embodiment, the user is presented with information about the related web pages shown in FIG. 2 or FIG. 3. In one embodiment, the identity of the authors who selected the web page is revealed to the user by displaying meta-data such as the author's name, institution, and qualifications.

Figure 4:
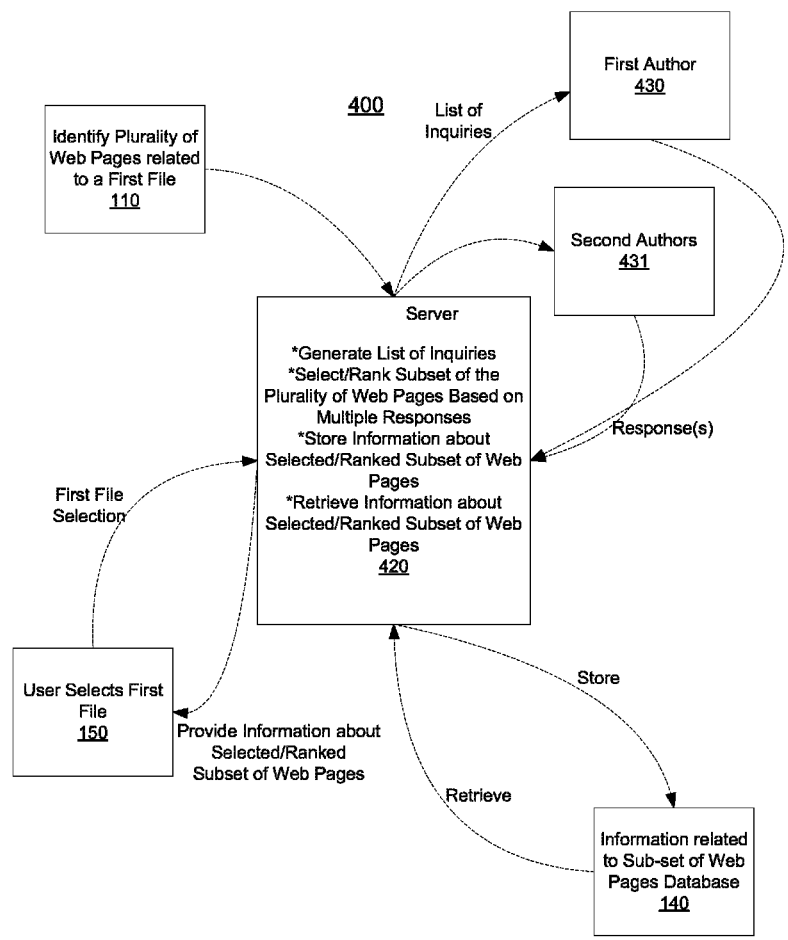
FIG. 4 is a block diagram of an embodiment of a system of providing related web pages, where more than one author provides input to selecting/ranking a subset of web pages.

FIG. 4 is a block diagram of an embodiment of system 400, a system of providing related web pages, where more than one author provides input to selecting/ranking a subset of web pages. A set of web pages related to the first file 110 is identified in the World Wide Web by server 420. The set of web pages is derived based on a relationship such as author, frequently use noun-phrases, and common subject matter with the first file. Server 420 generates a list of inquiries based on the set of web pages related to the first file. In an embodiment, the list of inquiries includes questions asking the authors whether the related web pages are relevant to the first file as determined by the search engine.

The list of inquiries generated by server 420 is notified to the first author 430. In the described embodiments, a first author is the author of the first file, an expert on the subject matter or a team member or anyone who has write-privilege to the first file. The list of inquiries is also notified to second authors 431. In the described embodiments, the second author is one or more authors other than the first author. The first and second authors are notified electronically as described in conjunction with FIG. 1. Server 420 receives responses from the first author as well as the second authors. The response includes a selection of web pages related to the first file. In an embodiment, the response includes a ranked list of the related web pages, identifying the relevance of the related web pages to the first file. In an embodiment, web pages are ranked based on the number of selections from the first and the second authors. In an embodiment, the web pages selected by the first author are ranked higher than the web pages selected by second authors. In another embodiment, all responses are ranked with the same weight. In another embodiment, a certain number of ranked web pages are selected. In another embodiment, all web pages selected by the first author and the second authors are selected.

Information about the selected/ranked web pages is stored in a storage system 140. User selection of the first file identifier 150 from search results or any other listing is sent to server 420. In several embodiments, server 420 retrieves information about the selected/ranked list of related web pages from the file storage system before presenting to the user as shown in FIG. 2 and FIG. 3. In one embodiment, the identity of the authors who selected each web page is revealed to the user by displaying meta-data such as the author's name, institution, and qualifications.

Figure 5:
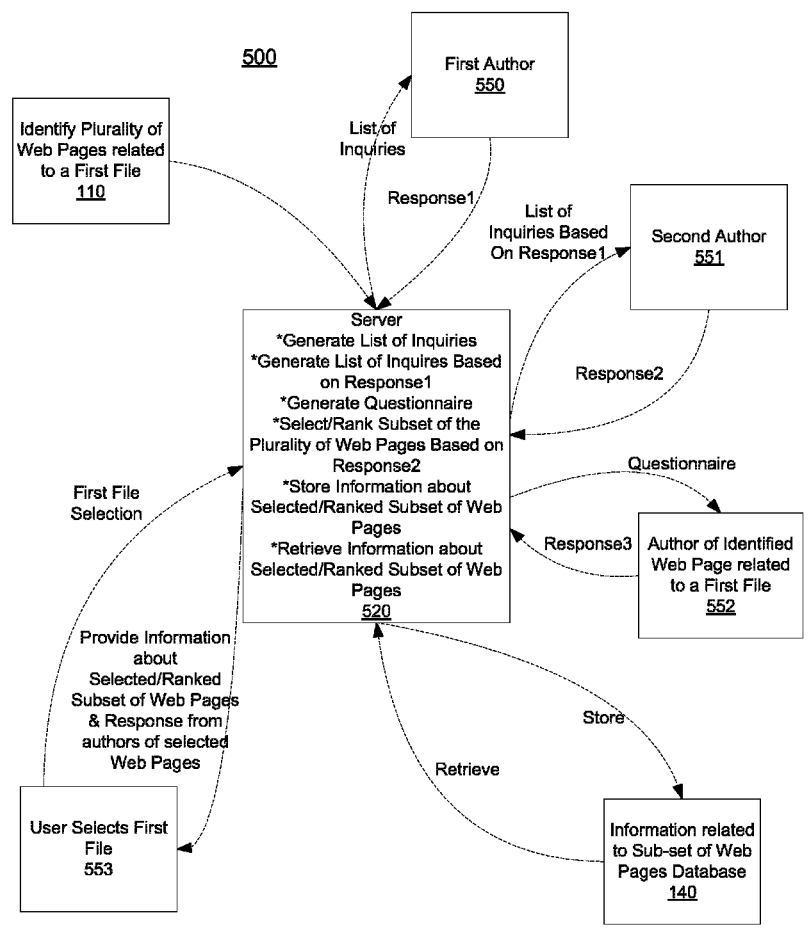
FIG. 5 is a block diagram of an embodiment of a system of providing related web pages in the world wide web, where more than one author is involved in the selecting/ranking a subset of web pages and more than one list of inquiries is generated.

FIG. 5 is a block diagram of an embodiment of system 500, a system of providing related web pages, where more than one author provides input to selecting/ranking a subset of web pages and more than one list of inquiries is generated. One or more web pages related to a first file are identified in the World Wide Web (similar to the description in conjunction with FIG. 1). A list of inquiries is generated by server 520 based on the web pages related to the first file. In an embodiment, the list of inquiries includes questions asking the relevance of the related file to the first file. The list of inquiries is notified to a first author 550. A first response is received from first author 550 by server 520. The first response includes selection of web pages that are related to the first file in the opinion of first author 550. In an embodiment, the first response includes a ranked list of the related web pages, identifying the relevance of the related web pages to the first file. A second list of inquiries is generated based on the first response. The second list of inquiries includes questions about the selection of the web pages related to the first file by the first author. In an embodiment, the second list of inquiries includes the related web pages and the search terms used to identify the related file or the noun-phrases used to identify the web pages.

Second authors 551 are notified electronically (by methods discussed in conjunction with FIG. 1) with the second list of inquiries. Server 520 receives the second response from second authors and analyzes the second response. The second response further refines the machine generated search results. The second response includes a selection of web pages related to the first file. In an embodiment, the second response includes a ranked list of the related web pages, identifying the relevance of the related web pages to the first file. Server 520 ranks a related file based on the number of selections from second authors. In an embodiment, a subset of the ranked related web pages is selected.

In an embodiment, server 520 generates a questionnaire based on identified web pages related to the first file 110. The questionnaire includes the opinion of one or more authors of the identified web pages about the selection as a related web page to the first file. The questionnaire is notified to the authors of identified web pages 552. Server 520 receives responses from the authors of identified web pages 552. In an embodiment, server 520 ranks an identified web page based on the number of selections from second authors 551 and the selection from the author of identified web page 552. A subset of the ranked related files is selected.

In an embodiment, all web pages selected by second authors are selected for ranking. In another embodiment, related web pages receiving a certain rank are selected. Information related to the selected/ranked files is stored in storage system 140. In an embodiment, the information related to the selected/ranked web page includes one or more of hyper-link to the selected web page, the author of the selected web page, the title of the selected web page, the authors, the opinion of the author of the selected file, opinion of the authors of the first file, institution of the author, the published date, and the selection/rank date. When a user selects the first file identifier 553, server 520 retrieves the information related to the selected related web pages from storage system 140. In several embodiments, information related to the subset of selected/ranked web pages is presented to the user as shown in FIG. 2 and FIG. 3. In one embodiment, the identity of the authors who selected each file is presented to the user by displaying meta-data such as the author's name, institution, and qualifications. In another embodiment, information about the opinion of the author of the selected web page is presented to the user.

Figure 6:
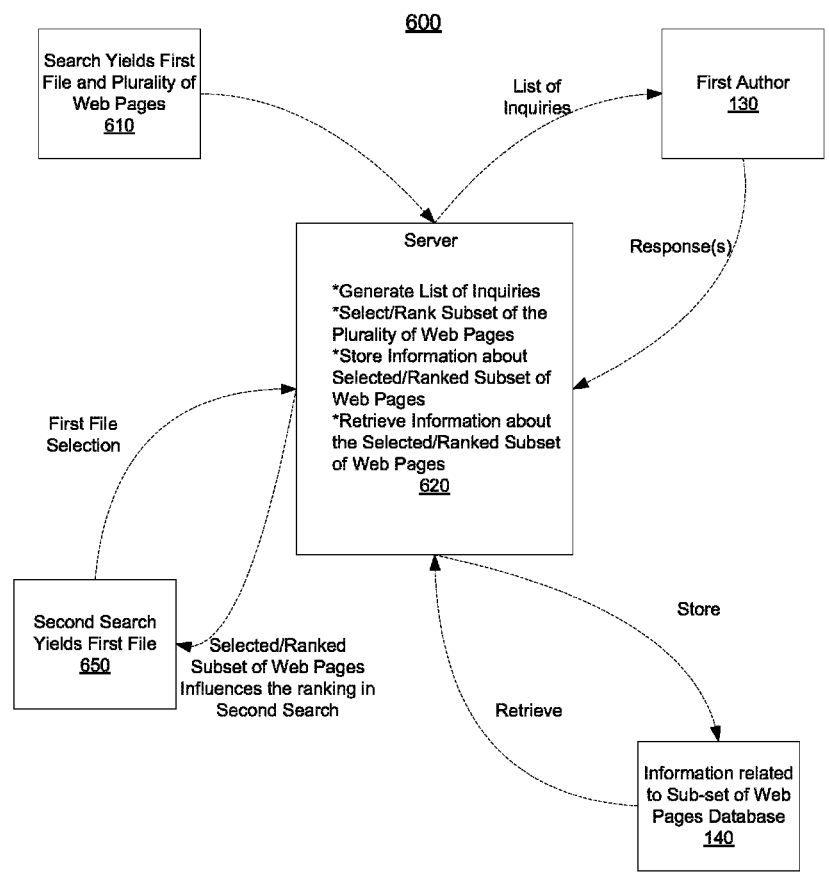
FIG. 6 is a block diagram of an embodiment of a system of providing related web pages, where an author provides input to selecting/ranking a subset of web pages, where a search yields a first file.

FIG. 6 is a block diagram of system 600, an embodiment of a system of providing related web pages, where an author is involved in the selecting/ranking a subset of web pages, where a search yields a first file. Server 620 searches for a first file in the World Wide Web. The search engine outputs a list of web pages 610 related to the first file based on search techniques described in conjunction with FIG. 1. Server 620 generates a list of inquiries based on the list of related web pages. The list of inquiries includes questions whether each of the web pages from search results are relevant to the first file.

The list of inquiries is notified to the author of the file 130. A response is received from the author. The response includes a selection of web pages related to the first file and optionally the reason for relevancy in the author's opinion. In an embodiment, the response includes a ranked list of the related web pages, identifying the relevance of the related web pages to the first file. Server 620 ranks the related web pages based on the response from the author. A subset of the ranked related web pages is selected. Server 620 stores information about the subset of selected/ranked web pages in a file storage system 160. When a second search yields a plurality of search results containing the information identifying first file 650, server 620, retrieves the stored information about the subset of selected/ranked web pages and influences the ranking of the first file relative the search results when presenting the search results to the user. In one embodiment, the identity of the authors who selected each web page is revealed to the user by displaying meta-data such as the author's name, institution, and qualifications.

Methods

Figure 7:
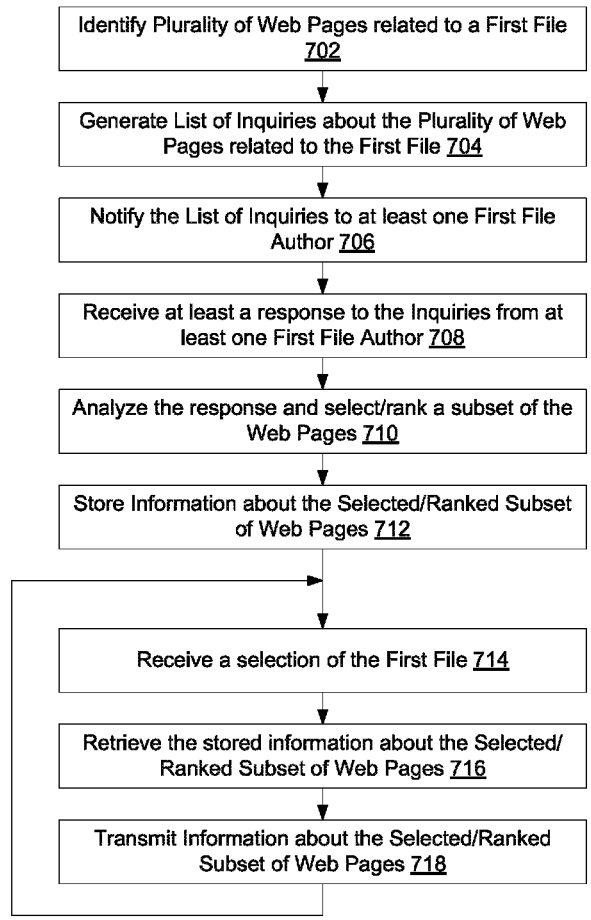
FIG. 7 is a flowchart that includes the steps of an example of a method of providing related web pages in the World Wide Web, where one or more authors provide input to selecting/ranking a subset of web pages.

FIG. 7 is a flowchart that includes the steps of an example of a method of providing related web pages, where an author is involved in the selecting/ranking a subset of web pages. In step 702, the World Wide Web is searched to identify one or more web pages that are related to a first file. In an embodiment, the search is based on any of or all of natural language search, machine language search, text analysis, or collaborative filtering. The World Wide Web is searched for keywords that are automatically generated by the server. In an embodiment, the keywords may be the author/authors of the first file, frequently appearing words, authors of cited references in the first file, noun phrases based on subject matter, and title. In an embodiment, the search is conducted on the full-text of the file. In another embodiment, only the abstract and the title are searched. In an embodiment, only web pages published after the first file's published date are searched. In an embodiment, the algorithm used to generate the search terms using ENTREZ™ API automatically extracts noun phrases from the first file using natural language processing tools and ranks them by the number of occurrences in the file compared to the number of occurrences on the web. In an embodiment, citation-validation is used to generate the list of related web pages to improve the quality and relevance of the search results.

In step 704, the server automatically generates a list of inquires based on the search results of step 702 to access the relevancy of the search result. The list of inquiries includes questions about each of the related web pages. In an embodiment, inquiries list the title of one or more web pages identified in the search, the publication date, and the search terms used to identify the file. Other embodiments may not list all the above items. FIG. 2 and FIG. 3, show an example of the list of inquiries presented to authors. In step 706, the list of inquiries is notified to at least one author of the first file. In the described embodiments, the notification can be sent electronically by an email, or a message on a social network or instant message. Web based interface is another method of notifying the author.

In step 708, method 700 receives at least one response to the list of inquiries from the authors of the first file. The response includes a selection whether any of the web pages are relevant to the first file and if any of the web pages are relevant, a selection of the relevant file and optionally the reason for the file being relevant. In an embodiment, the response includes a list of the related web pages, identifying the relevance of the related web pages to the first file. In step 710, method 700 analyzes the responses from the authors. The related web pages are ranked based on the number of selections received from the authors. A subset of the ranked related web pages is selected. In an embodiment, all web pages selected by the authors are selected. In another embodiment, a certain number of ranked web pages are selected. In another embodiment, web pages receiving certain rank are selected. Method 700 creates a hyperlink between the first file and the selected/ranked subset of web pages. The hyperlink can influence the search results in the World Wide Web when the first file is involved. In step 712, information about the selected/ranked web pages related to the first file is stored. The information about the selected/ranked web pages includes at least one of hyperlinks to the web pages in the World Wide Web, the rank of each file in the selected subset, metadata of the web pages. The information may be stored on the World Wide Web or any other storage system.

Steps 702-712 are performed to generate a list of selected/ranked web pages that may be more relevant than the machine generated references. In an embodiment, steps 702-712 are performed once. In another embodiment, steps 702-712 are performed at certain fixed intervals. In another embodiment, events such as addition of a certain number of web pages or a manual intervention may trigger steps 702-712.

In step 714, method 700 receives a selection of the first file identifier or information about the first file from a user. The file or information about the file may be selected from search results or from a list of web pages. The server retrieves the stored information about the selected/ranked web pages in step 716. In several embodiments, information about the related web pages is displayed to the user in step 718 as shown in FIG. 2 and FIG. 3. Steps 714-718 are performed when a user selects the first file for display. In one embodiment, the identity of the authors who selected each web page is revealed to the user by displaying meta-data such as the author's name, institution, and qualifications.

In an embodiment, each of the steps of method 700 may be a distinct step. In other embodiments, method 700 may not have all of the above steps and/or may have other steps in addition to or instead of those listed above. The steps of method 700 may be performed in another order. Subsets of the steps listed above as part of method 700 may be used to form their own method. In an embodiment, there could be multiple instances of method 700.

Figure 8:
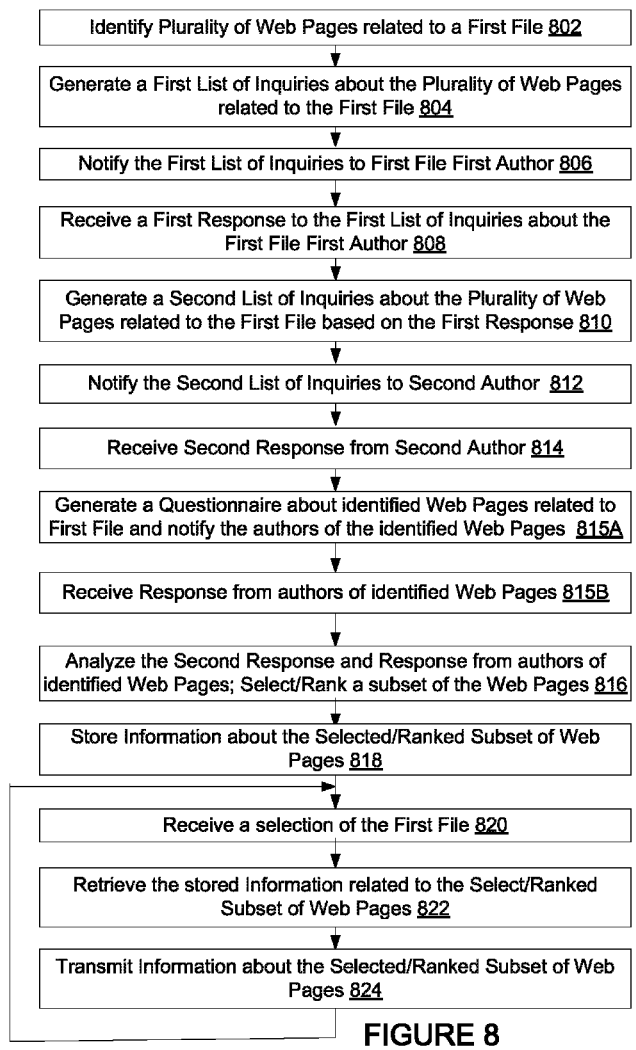
FIG. 8 is a flowchart that includes the steps of an example of a method of providing related web pages in a network, where more than one list of inquiries is generated and more than one author is involved in the selecting/ranking a subset of web pages.

FIG. 8 is an example of a flowchart that includes the steps of method 800 of providing a list of related web pages, where more than one list of inquiries is generated and more than one author is involved in the selecting/ranking a subset of web pages. In this method, at least two distinct lists of inquiries are generated, the first list of inquiries is sent to the first author and the second list of inquiries is sent to the other authors. The second list of inquiries is generated based on the response from the first author.

In method 800, a set of one or more web pages related to a first file is identified in step 802. In step 804, a first list of inquiries about the set of web pages identified in step 802 is generated. The first list of inquires includes questions whether each of the identified web pages are related to the first file and optionally why they are related. In the described embodiment, steps 802 and 804 are similar to steps 702 and 704 respectively. The first list of inquiries is notified to a first author of the first file in step 806. A first response to the first list of inquiries is received in step 808. The response includes a selection of web pages related to the first file and optionally the reason for the selection. In step 810, a second list of inquires based on the response from the first author about the relevance of the set of web pages to the first files is generated. In an embodiment, the second list of inquiries includes a list of web pages selected by the first author for selecting web pages related to the first file. In an embodiment, the second list of inquires includes questions whether the second author agrees with the first author. In another embodiment, the second list of inquiries includes the reason for a file being relevant to the first file. One or more second authors of the first file are notified with the second list of inquiries in step 812. In step 814, one or more second response is received from the second authors 551. In an embodiment, a questionnaire is generated based on the list of identified web pages in step 815A. The questionnaire includes whether the identified web pages is related to the first file. The questionnaire is notified to one or more authors of the plurality of identified web pages.

In step 815B, server 520 receives response from one or more authors of the plurality of identified web pages.

In step 816, the second response from the second authors is analyzed. In an embodiment, response from one or more authors of the identified web pages is analyzed. In an embodiment, web pages are ranked based on the number of selections from the second authors. In another embodiment, web pages are ranked based on the response from authors of identified web pages in addition to the response from second authors. In an embodiment, the response includes identifying the relevance of the related web pages to the first file. A subset of the ranked web pages is selected. In an embodiment, all web pages selected by the second authors are selected. In another embodiment, a certain number of ranked web pages or web pages with a certain rank are selected. Method 800 creates a hyperlink between the first file and the selected/ranked subset of web pages. The hyperlink can influence the search results in the World Wide Web when the first file is involved. In step 818, information about the selected/ranked subset of web pages related to the first file is stored in a file storage system.

Steps 802-818 are performed to generate a list of selected/ranked web pages that may be more relevant than the machine generated references. In an embodiment, steps 802-818 are performed once. In another embodiment, steps 802-818 are performed at certain fixed intervals. In another embodiment, events such as addition of a certain number of web pages or a manual intervention may trigger steps 802-818.

In step 820, the server receives a selection of the first file identifier. Information about the related web pages of the first file stored in a file storage system is retrieved in step 822. Information about the list of related web pages is presented to the user in step 824. Steps 820-824 are performed when a user selects the first file for display. Steps 818, 820, 822, and 824 are similar to steps 712, 714, 716, and 718 respectively. In an embodiment, each of the steps of method 800 may be a distinct step. In other embodiments, method 800 may not have all of the above steps and/or may have other steps in addition to or instead of those listed above. The steps of method 800 may be performed in another order. Subsets of the steps listed above as part of method 800 may be used to form their own method. In an embodiment, there could be multiple instances of method 800.

Figure 9:
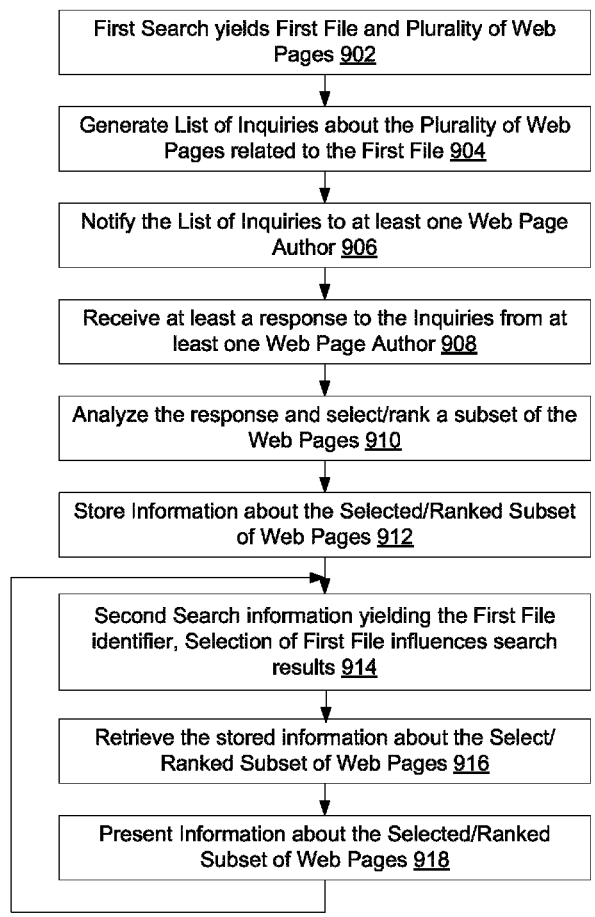
FIG. 9 is a flowchart of an example of a method of providing a list of related web pages, where an author is involved in the selecting/ranking a subset of web pages, where a search yields a first file.

FIG. 9 is an example flowchart of method 900 of providing a list of related web pages, where an author provides input to selecting/ranking a subset of web pages, and a search yields a first file. A first search in the World Wide Web using a search engine provides a list of web pages related to the first file in step 902. In an embodiment, the algorithm used to generate the search terms using Entrez® API automatically extracts noun phrases from the first file using natural language processing tools and ranking them by the number of occurrences in the file compared to the number of occurrences on the web. In an embodiment, citation-validation is used to generate the list of related web pages. A list of inquiries is generated based on the web pages related to the first file in step 904. The list of inquiries includes whether each web page listed as related web page from the search results is related to the first file and optionally the reason for being related. In step 906, the list of inquiries is notified to one or more authors. In step 908, method 900, receives at least one response from the authors providing information about the relevancy of related web pages to the first file and optionally the reason for a web page being related in the opinion of the author. In step 910, the related web pages are ranked based on the number of selections from the authors. In an embodiment, the response includes a ranked list of the related web pages, identifying the relevance of the related web pages to the first file. A subset of the ranked web pages is selected. Information related to the subset of web pages is stored in a file storage system in step 912. Method 900 creates a hyperlink between the first file and the selected/ranked subset of web pages. The hyperlink can influence the search results in the World Wide Web when the first file is involved. Steps 904, 906, 908, 910, and 912 may be similar to steps 704, 706, 708, 710 and 712.

Steps 902-912 are performed to generate a list of selected/ranked web pages that may be more relevant than the machine generated references. In an embodiment, steps 902-912 are performed once. In another embodiment, steps 902-912 are performed at certain fixed intervals. In another embodiment, events such as addition of a certain number of web pages or a manual intervention may trigger steps 902-912.

A second search in the World Wide Web using a search engine yields a first file and the server receives a selection of the first file identifier in step 914. The selection of the first file can influence the search results of future searches. The server retrieves information about the related web pages (stored in step 912) from the file storage system in step 916. In several embodiments, in step 918, information about the related web pages is presented to the user as shown in FIG. 2 and FIG. 3. In one embodiment, the identity of the authors who selected each web page is revealed to the user by displaying meta-data such as the author's name, institution, and qualifications. Steps 914, 916, and 918 may be similar to steps 714, 716 and 718. Steps 914, 916, and 918 are repeated for every search yielding the first file. In an embodiment, each of the steps of method 900 may be a distinct step. In other embodiments, method 900 may not have all of the above steps and/or may have other steps in addition to or instead of those listed above. The steps of method 900 may be performed in another order. Subsets of the steps listed above as part of method 900 may be used to form their own method. In an embodiment, there could be multiple instances of method 900.

Identifying Related Web Pages

One or more web pages related to a first file in the World Wide Web are identified by server 120 or server 420 or server 520. In the described embodiments, the first file can reside in an author system 1022, or in the World Wide Web 1020 or in server system 1002. In several embodiments, the related web pages are identified by natural language search, or a text analysis, or from collaborative filtering, or any other search techniques. In an embodiment, server 120 or 420 or 520 extracts noun phrases from web pages in the World Wide Web using natural language processing tools and ranks them by the number of occurrences in the file compared to the number of occurrences on the web. In one embodiment, server 620 searches the World Wide Web uses ENTREZ® API to automatically extract noun phrases from web pages using natural language processing tools and rank them by the number of occurrences in the file compared to the number of occurrences on the web. In an embodiment, citation-validation is used to generate the list of related web pages.

In another embodiment, the PubMed "related citations" method is used to identify the web pages or papers published after the first file in the World Wide Web called PubMed. On PubMed, related citations are derived from text-analysis of web pages, and a ranked list of web pages that may be related is presented to the user. For each word or term in each file, a numeric weight is computed based on the number of times the word occurs in the file and the number of web pages the term occurs in within the World Wide Web. The numeric-weight is used to find the most similar pairs of files or web pages. For any paper or file on PubMed, related citations may be obtained using the ENTREZ® API when available.

Generation of List of Inquiries

In an embodiment, the list of inquiries generated by the system server includes one or more identified web pages related to a first file. In an embodiment, the inquiries include the search terms used in a search using text analysis or collaborative filtering. In another embodiment, the list of inquires includes one or more identified web pages and the noun-phrases from the first file used to identify the web pages. In an embodiment, the list of inquiries presented to the first author includes one or more titles of related of web pages, the search term used to identify the related web pages, the noun-phrases which are validated by their presence in the citations of the first file, the publication date. The list of inquiries to the second authors is influenced by a response received from a first author. The list of inquiries to second authors includes one or more of the selection of related web pages by the first author, the search terms used to identify the related file, the noun-phases used in citation-validation techniques and the publication date. In an embodiment, the list of inquiries includes one or more of the types of relationship tags of the identified file such as whether the identified web pages summarizes the first file, contradicts the first file, or complements the first file.

In an embodiment, a questionnaire is generated to the authors of the identified web pages. The questionnaire may contain questions whether the identified web page is related to the first file. The list of inquires is notified electronically to one or more authors. The notification comprises at least one of an email, messaging on a social network, instant message or a web-based interface notification.

Selection and Ranking of Related Web Pages

The related web pages are ranked based on the number of selections from the authors. In an embodiment, a selection of the related web pages from each author is ranked equally. In another embodiment, selection of a web page from the first author receives higher ranking. In another embodiment, selection of a web page from an author who responds to queries more often is ranked higher. In another embodiment, selection by the author of the identified web pages is ranked higher. In another embodiment, selection of a web page by the author of the first file and author of the web page is ranked highest. A subset of the related web pages is selected. In an embodiment, all web pages selected by the authors are selected. In another embodiment, a certain number of the ranked web pages are selected. In another embodiment, web pages receiving a certain rank are selected.

In an embodiment, a method of identifying web pages of the world wide web having relevance to a first file, comprising identifying a plurality of web pages within the world wide web, wherein the plurality of web pages each have a relationship with the first file; generating, by a system server, a list of inquiries based on the plurality of web pages; providing, by the system server, the list of inquiries to at least one author of the first file; receiving from the at least one author at least one response to the list of inquiries; selecting a subset of the plurality of web pages based on the at least one response; storing information related to the selected subset of the plurality of web pages for access if the first file is selected.

In an embodiment, the method further comprising generating, by the system server, a second list of inquiries based on the plurality of web pages; providing, by the system server, the second list of inquiries to at least one second author of the plurality of web pages; receiving from the at least one second author of the plurality of web pages at least one second response to the second list of inquiries; re-selecting the subset of the plurality of web pages based on the at least one response and the at least one second response; storing information related to the re-selected subset of the plurality of web pages for access if the first file is selected.

In an embodiment, the method further comprising providing, by the system server, the selected subset of the plurality of web pages to a user that selects the first file and identifying the at least one author to the user as shown in FIG. 2 or FIG. 3. In an embodiment, a method wherein identifying the at least one author comprises providing the user with the at least one author's name, qualifications or institution. In an embodiment, the method further comprising providing, by the system server, the selected subset of the plurality of web pages to a user that selects the first file and identifying the at least one author of the first file, and the at least one author of the plurality of web pages to the user, wherein identifying the at least one author comprises providing the user with the at one of a name, qualifications or institution of the at least one author.

In an embodiment, the method further comprising providing a hyperlink between the first file and the selected subset of the plurality of web pages, wherein the hyperlink influences a ranking of search results that include at least one of the first file and the plurality of web pages. In an embodiment, the method wherein the plurality of web pages are each identified by a plurality of subject-matter searches, wherein each search identifies one of the plurality of web pages and the first file. In an embodiment, a method wherein at least one of the plurality of subject-matter searches is refined by the at least one response. In an embodiment, a method wherein at least one of the plurality of subject-matter searches uses a keyword search application programming interface to access web pages in a world wide web. In an embodiment, a method wherein the list of inquiries includes search terms used in a search that identified the first file and the plurality of web pages, thereby establishing a relationship between the first file and the plurality of web pages by text analysis or collaborative filtering. In an embodiment, a method wherein the search terms comprise strings of words or noun phrases or author names cited by the first file. In an embodiment, a wherein the search terms comprise a term within the first file. In an embodiment, a method where the search is based on at least one of a word string, an author, or an image.

In an embodiment, a method wherein the search terms are included within text of citations of the first file. In an embodiment, a method wherein each of the plurality of web pages includes a publication date, wherein each of the publication dates is more recent than at least one of a first revision or a last revision date of the first file. In an embodiment, a method wherein each of the plurality of web pages includes a publication date, and wherein each of the publication dates is a specific date or a date before the specific date. In an embodiment, a method wherein the list of inquiries includes titles of at least a subset of the plurality of web page or authors of at least a subset of the plurality of web pages. In an embodiment, a method wherein the at least one author includes a first author and a second author, and wherein the list of inquiries for the first author is influenced by a response received from the second author. In an embodiment, a method wherein the list of inquiries includes a relationship tag between at least one of the plurality of web pages and the first file. In an embodiment, a method where in the relationship tag question comprises at least one question whether the relationship of the at least one of the plurality of web pages to the first file is supportive, contradictory or summarizing.

In an embodiment, a method wherein providing the list of inquiries to the at least one author of the first file comprises electronically communicating the list of inquires to the at least one author using a notification. In an embodiment, a method wherein the notification comprises at least one of an email, messaging on a social network, or instant message. In an embodiment, a method wherein the notification comprises a web-based interface notification. In an embodiment, a method wherein receiving from the at least one author at least one response to the list of inquiries comprises receiving a selected subset of the plurality of web pages that the at least one author selects as being relevant to the first file.

In an embodiment, a method wherein receiving from the at least one author at least one response to the list of inquiries comprises receiving a ranked list of at least a subset of the plurality of web pages that identifies an order of relevance of the at least the subset of the plurality of web pages to the first file. In an embodiment, a method comprising providing the at least one inquiry based on one response to at least one other author; receiving from the at least one other author at least one second response to the at least one response; re-selecting the subset of the plurality of web pages based on the at least one second response; storing information related to the re-selected subset of the plurality of web pages for access if the first file is selected. In an embodiment, a method wherein the list of inquiries is provided to a plurality of authors, and responses received from each of the plurality of authors are compiled for selecting the subset of the plurality of web pages. In an embodiment, a method wherein a plurality of lists of inquiries are provided to a plurality of authors, and responses received from each of the plurality of authors are compiled for selecting the subset of the plurality of web pages. In an embodiment, a method further comprising the at least one author having a permission to edit the first file. In an embodiment, a method for a server to identify web pages having relevance to a first file, comprising receiving, by the server, a plurality of web pages, wherein the plurality of web pages were generated by a subject matter search; generating, by the server, a list of inquiries based on the plurality of web pages; providing, by the server, the list of inquiries to an author of the first file, wherein the first file is a one of the plurality of web pages; receiving, by the server, from the author at least one response to the list of inquiries; selecting, by the server, a subset of the plurality of web pages based on the at least one response; storing, by the server, the selected subset of the plurality of web pages for access if the first file is selected.

In an embodiment, a method further comprising providing, by the server, the selected subset of the plurality of web pages to a user that selects the first file. In an embodiment, a system for identifying web pages having relevance to a first file, comprising a server configured to present on a first display a list of inquiries to an identified author of a first file, wherein the list of inquiries is based on a plurality of web pages; the server configured to receive from the identified author at least one response to the list of inquiries; the server configured to select a subset of the plurality of web pages based on the at least one response; a server configured to present on a second display the selected subset of the plurality of web pages to a user that selects the first file. In an embodiment, a programmable storage device readable by a machine, tangibly embodying a program of instructions when executed by the machine to perform a method of identifying web pages of a world wide web having relevance to a first file, the method comprising identifying a plurality of web pages within the world wide web, wherein the plurality of web pages each have a relationship with the first file; generating, by a system server, a list of inquiries based on the plurality of web pages; providing, by the system server, the list of inquiries to at least one author of the first file; receiving from the at least one author at least one response to the list of inquiries; selecting a subset of the plurality of web pages based on the at least one response; storing information related to the selected subset of the plurality of web pages for access if the first file is selected.

In an embodiment, a method of identifying web pages in a world wide web having relevance to a first file, comprising: identifying a plurality of web pages within the world wide web, wherein the plurality of web pages each have a relationship with the first file; generating, by a system server, a first list of inquiries based on the plurality of web pages; providing, by the system server, the first list of inquiries to at least one author of the first file; receiving from the at least one author of the plurality of web pages at least one first response to the first list of inquiries; generating, by the system server, a second list of inquiries based on the plurality of web pages; providing, by the system server, the second list of inquiries to at least one second author of the plurality of web pages; receiving from the at least one second author of the plurality of web pages at least one second response to the second list of inquiries; selecting a subset of the plurality of web pages based on the at least one first response and the at least one second response; storing information related to the selected subset of the plurality of web pages for access if the first file is selected. In an embodiment, a method wherein the information related to the selected subset of the plurality of web pages comprises an opinion of the at least one author of either the first file or the plurality of web pages. In an embodiment, a method comprising providing the opinion of the at least one author to a user that selects the first file.

System

Figure 10:
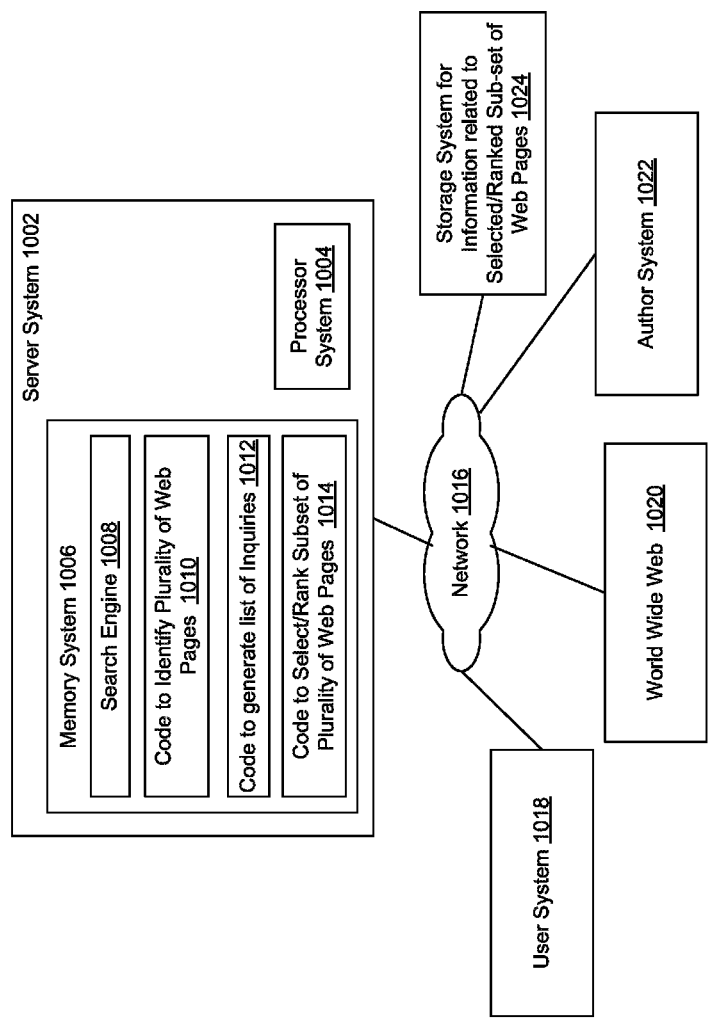
FIG. 10 shows an example of a block diagram of a system of providing related web pages to a search result in the World Wide Web.

FIG. 10 shows a block diagram of system 1000, an embodiment of a system of providing related web pages to a search result. The system consists of server system 1002, network 1016, user system 1018, World Wide Web 1020, author system 1022, and storage system for information related to selected/ranked subset of web pages 1024 among others. In other embodiments, system 1000 may not have all of the elements or features listed and/or may have other elements or features instead of or in addition to those listed.

As shown in FIG. 10, for the described embodiments, server system 1002 includes processor system 1004 and memory system 1006 among others. Server system 1002 consists of on one or more servers connected to the network. Server system 1002 can be a single unit, distributed in various locations, or virtualized. Processor system 1004 may include any one of, some of, any combination of, or all of multiple parallel processors, a single processor, a system of processors having one or more central processors and/or one or more specialized processors dedicated to specific tasks. Also, processor system 1004 may include one or more Digital Signal Processors (DSPs) in addition to or in place of one or more Central Processing Units (CPUs) and/or may have one or more digital signal processing programs that run on one or more CPU.

Memory system 1006 may include, for example, any one of, some of, any combination of, or all of a long-term storage system, such as a hard drive; a short-term storage system, such as random access memory; a removable storage system, such as a floppy drive or a removable drive; and/or flash memory. Memory system 1006 may include one or more machine-readable mediums that may store a variety of different types of information. The term machine-readable medium is used to refer to any medium capable carrying information that is readable by a machine. One example of a machine-readable medium is a computer-readable medium.

In an embodiment, memory system 1006 stores code for search engine 1008, code to identify plurality of web pages 1010, code to generate a list of inquiries/questionnaire 1012, and code to select/rank subset of plurality of web pages 1014.

Memory system 1006 stores code for search engine 1006 to search the World Wide Web for web pages related to a first file and returns the result to server system 1002. In the described embodiments, the first file can reside in the World Wide Web 1020, or author system 1022, or storage system for information related to selected/ranked subset of web pages 1024 or memory system 1006 or any other storage system. In an embodiment, the search engine searches the abstract of the file. In another embodiment, the search engine searches the entire file for keywords. The results from the search engine are ranked in order of relevancy. The relevancy may be the number of times the keyword appears in the file, and the number of hyperlinks.

The keywords for searching related web pages are supplied by the code to identify plurality of web pages 1010. The keywords may be all of or some of frequently used noun phrases, the author of the first file, the authors listed in the references cited in the first file, words from the title, publication date, words related to subject matter. Once the server receives the list of web pages related to the first file, an inquiry is automatically generated by code to generate a list of inquiries 1012 and sent to one or more authors. The list of inquiries is based on the search results. The inquiries include the relevancy of each of web pages listed as a related file to the first file, the reason for the file being related to the first file. Code to select/rank subset of plurality of web pages 1014, selects a subset of the web pages from search results, stores information about the selected subset of web pages, and provides a hyperlink between the first file and the selected subset of web pages. Selection of web pages may also include ranking the web pages based on the number of selection from the authors. In an embodiment, responses from different authors can have different weight. Information related to the selected/ranked subset of web pages is stored. In an embodiment, the information related to the selected/ranked subset of web pages is stored on a storage system for information related to selected/ranked subset of web pages 1024. In another embodiment, the information related to the selected/ranked subset of web pages is stored in memory system 1006. In another embodiment, the information related to the selected/ranked subset of web pages is stored in the World Wide Web. In an embodiment, a hyperlink is created between the first file and the selected subset of web pages. The hyperlink influences the ranking of search results by the search engine when the first file is involved.

Network 1016 is a network and/or combination of networks of devices that communicate with one another within an enterprise or on the Internet. User system 1018 is a user device connected to the network 1016. User system 1018 selects a file from the World Wide Web. The file is selected from a search result or from a listing of web pages. World Wide Web 1020 is a system of web pages, where the web pages may be interlinked documents accesses via network 1016. All users can access the World Wide Web to read and in some cases contribute to the World Wide Web. Author system 1022 is a user system in the network. In an embodiment, author system 1022 has read and write access to web pages in the World Wide Web. An embodiment includes a programmable storage device (such as memory system 1002) readable by a machine (such as, processor system 1004), tangibly embodying a program of instructions when executed by the machine to perform a method of identifying web pages of a world wide web having relevance to a first file. The method includes identifying a plurality of web pages within the world wide web, wherein the plurality of web pages each have a relationship with the first file, wherein the world wide web provides a platform for sharing web pages, and wherein each web page includes a document or information resource that is suitable for the world wide web and is accessible through a web browser. The method further includes generating, by a system server, a list of inquiries based on the plurality of web pages, providing, by the system server, the list of inquiries to at least one author of the first file, receiving from the at least one author at least one response to the list of inquiries, selecting a subset of the plurality of web pages based on the at least one response, and storing information related to the selected subset of the plurality of web pages for access if the first file is selected.

Although specific embodiments have been described and illustrated, the described embodiments are not to be limited to the specific forms or arrangements of parts so described and illustrated.

The invention claimed is:

1. A method of identifying web pages of a world wide web having relevance to a first file, comprising:
   identifying a plurality of web pages within the world wide web, wherein the plurality of web pages each have a relationship with the first file, wherein each of the plurality of web pages includes a publication date, wherein each of the publication dates is more recent than at least one of a first revision or a last revision date of the first file, wherein the world wide web provides a platform for sharing web pages, and wherein each web page includes a document or information resource that is suitable for the world wide web and is accessible through a web browser;
   generating, by a system server, a list of inquiries based on the plurality of web pages;
   providing, by the system server, the list of inquiries to at least one author of the first file;
   receiving from the at least one author at least one response to the list of inquiries;
   selecting a subset of the plurality of web pages based on the at least one response; and
   storing information related to the selected subset of the plurality of web pages for access if the first file is selected;
   providing, by the system server, the selected subset of the plurality of web pages to a user that selects the first file; and
   identifying the at least one author to the user.

2. The method of claim 1, further comprising:
   generating, by the system server, a second list of inquiries based on the plurality of web pages;
   providing, by the system server, the second list of inquiries to at least one second author of the plurality of web pages;
   receiving from the at least one second author of the plurality of web pages at least one second response to the second list of inquiries;
   re-selecting the subset of the plurality of web pages based on the at least one response and the at least one second response; and
   storing information related to the re-selected subset of the plurality of web pages for access if the first file is selected.

3. The method of claim 1, further comprising providing, by the system server, the selected subset of the plurality of web pages to a user that selects the first file and identifying the at least one author to the user.

4. The method of claim 3, wherein identifying the at least one author comprises providing the user with a name, qualifications or institution of the at least one author.

5. The method of claim 1, further comprising:
   providing, by the system server, the selected subset of the plurality of web pages to a user that selects the first file and
   identifying the at least one author of the first file, and the at least one author of the plurality of web pages to the user, wherein identifying the at least one author comprises providing the user with a name, qualifications or institution of the at least one author.

6. The method of claim 1, further comprising providing a hyperlink between the first file and the selected subset of the plurality of web pages, wherein the hyperlink influences a ranking of search results that include at least one of the first file and the plurality of web pages.

7. The method of claim 1, wherein the plurality of web pages are each identified by a plurality of subject-matter searches, wherein each search identifies one of the plurality of web pages and the first file.

8. The method of claim 7, wherein at least one of the plurality of subject-matter searches is refined by the at least one response.

9. The method of claim 8, wherein at least one of the plurality of subject-matter searches uses a keyword search application programming interface to access web pages in a world wide web.

10. The method of claim 1, wherein the list of inquiries includes the at least one author of at least a subset of the plurality of web pages.

11. The method of claim 1, wherein the at least one author includes a first author and a second author, and wherein the list of inquiries is for the first author and is influenced by a response received from the second author.

12. The method of claim 1, wherein the list of inquiries includes a relationship tag between at least one of the plurality of web pages and the first file.

13. The method of claim 12, where in the relationship tag question comprises at least one question whether the relationship of the at least one of the plurality of web pages to the first file is supportive, contradictory or summarizing.

14. The method of claim 1, wherein receiving from the at least one author at least one response to the list of inquiries comprises receiving a selected subset of the plurality of web pages that the at least one author selects as being relevant to the first file.

15. The method of claim 1, wherein receiving from the at least one author at least one response to the list of inquiries comprises receiving a ranked list of at least a subset of the plurality of web pages that identifies an order of relevance of the at least the subset of the plurality of web pages to the first file.

16. The method of claim 1, further comprising:
   providing the list of inquiries based on one response to at least one other author;
   receiving from the at least one other author at least one second response to the at least one response;
   re-selecting the subset of the plurality of web pages based on the at least one second response; and
   storing information related to the re-selected subset of the plurality of web pages for access if the first file is selected.

17. The method of claim 1, wherein the list of inquiries is provided to a plurality of authors, and responses received from each of the plurality of authors are compiled for selecting the subset of the plurality of web pages.

18. The method of claim 1, wherein a plurality of lists of inquiries are provided to a plurality of authors, and responses received from each of the plurality of authors are compiled for selecting the subset of the plurality of web pages.

19. The method of claim 1, further comprising the at least one author having a permission to edit the first file.

20. A method for a server to identify web pages having relevance to a first file, comprising:
- receiving, by the server, a plurality of web pages, wherein the plurality of web pages were generated by a subject matter search, wherein each of the plurality of web pages includes a publication date, and wherein each of the publication dates comprises a date before a specific date;
- generating, by the server, a list of inquiries based on the plurality of web pages;
- providing, by the server, the list of inquiries to an author of the first file, wherein the first file is a one of the plurality of web pages;
- receiving, by the server, from the author at least one response to the list of inquiries;
- selecting, by the server, a subset of the plurality of web pages based on the at least one response; and
- storing, by the server, the selected subset of the plurality of web pages for access if the first file is selected.

* * * * *